US005090098A

United States Patent [19]

Seveik et al.

[11] Patent Number: 5,090,098

[45] Date of Patent: Feb. 25, 1992

[54] METHOD OF MANUFACTURING A ROMAN SHADE

[75] Inventors: Thomas Seveik, Denver; JeAnne M. Abrew, Broomfield, both of Colo.

[73] Assignee: Hunter Douglas Inc., Upper Saddle River, N.J.

[21] Appl. No.: 559,007

[22] Filed: Jul. 27, 1990

Related U.S. Application Data

[62] Division of Ser. No. 431,958, Nov. 6, 1989.

[51] Int. Cl.[5] .......... B23P 19/04

[52] U.S. Cl. .......... 29/24.5; 160/84.1; 428/116; 428/118

[58] Field of Search .......... 29/24.5; 160/84.1; 428/116, 118; 156/226, 227, 218

[56] References Cited

U.S. PATENT DOCUMENTS

| | | | |
|---|---|---|---|
| 3,963,549 | 6/1976 | Rasmussen | 160/84.1 |
| 4,347,887 | 9/1982 | Brown | 160/368.1 |
| 4,450,027 | 5/1984 | Colson | 428/116 |
| 4,631,217 | 12/1986 | Anderson | 160/84.1 |
| 4,677,012 | 6/1987 | Anderson | 160/84.1 |
| 4,677,013 | 6/1987 | Anderson | 160/84.1 |
| 4,685,986 | 8/1987 | Anderson | 160/84.1 |
| 4,846,243 | 7/1989 | Schneider | 160/84.1 |

*Primary Examiner*—P. W. Echols
*Assistant Examiner*—David P. Bryant
*Attorney, Agent, or Firm*—Fleit, Jacobson, Cohn, Price, Holman & Stern

[57] ABSTRACT

An improved expandable and contractible window covering comprising an assembly of elongated cells is disclosed. Each cell is formed by folding a strip of material and joining the opposed edges to the next adjacent cell. The rear wall of the cell is less wide than the front wall of the cell, and the material of the cell is chosen to be relatively soft and flexible, so that the front wall of each cell droops downwardly and outwardly away from the rear wall.

19 Claims, 4 Drawing Sheets

METHOD OF MANUFACTURING A ROMAN SHADE

This is a division of application Ser. No. 431,958, filed Nov. 6, 1989.

FIELD OF THE INVENTION

This invention relates to an improved window covering. More particularly, this invention relates to an improved window covering of the Roman shade type wherein one side of the shade, typically arranged so that this side is toward the interior of a room, consists of a number of horizontal parallel curved surfaces, and in which each of these curved surfaces forms the front wall of a tubular cell extending horizontally across the width of the shade, thus creating a thermal insulating window covering with an extremely attractive appearance.

BACKGROUND OF THE INVENTION

Several publications show cellular shades, wherein a fabric material is formed to define parallel tubular cells extending horizontally across the width of the shade. Air within each of the cells only circulates minimally, such that when expanded the shade provides good thermal insulation.

It is of course desirable to make the physical appearance of the shade as attractive as possible. Similarly, it is desirable to make such shades as economically as possible, which requires both that a minimal amount of material be used to form each cell and that the manufacturing process be as expeditious as possible.

Various exemplary prior art disclosures include the following:

French patent 1,568,745 to Landa (which has Netherlands and West German equivalents) discloses a screen wherein a plurality of strips of a fabric material are folded about fold lines extending longitudinally and bonded together, the two edges of each strip being bonded to the center of the successive strip, to form a shade consisting of a plurality of tubular cells. The Landa screen is intended to be used such that the cells extend vertically. Landa teaches symmetrical cell shapes only.

U.S. Pat. No. 4,347,887 to Brown shows a "thermal shutter". A wide band of material is folded transversely to form a double row column of adjacent cells, which may have rounded visible contours. The cells are adhesively bonded to one another. The Brown structure is symmetrical, so that both sides of the shade thus formed have essentially the same appearance.

U.S. Pat. No. 4,450,027 to Colson shows a method and apparatus for fabricating a multiple cell shade wherein a continuous relatively narrow strip of fabric is sharply creased longitudinally in order to define pleats in the shade material. A U-shaped cell structure is thus formed. Successive cells are assembled by applying an adhesive to opposed edges of the folded strips, and adhering each formed strip to the strip making up the next preceding cell. The Colson patent discloses strips that are sharply creased to facilitate the formation of the cells.

U.S. Pat. Nos. 4,631,217, 4,676,855 and 4,677,013 to Anderson show in FIG. 3 a shade of asymmetrical construction. A rear wall section of each cell is essentially straight or linear when the shade is in its expanded position. The width of these rear wall sections thus defines the spacing of the adjacent cells, while the front of each cell, containing more material, maintains a non linear shape.

The Anderson patent also discloses a method of forming an expandable and collapsible shade consisting of an assembly of horizontal parallel cells, in which the cell structure is formed from a material folded into a Z-shape rather than from the U-shaped material shown in the Colson patent.

U.S. Pat. No. 4,846,243 to Schneider shows a foldable window covering formed of a wide relatively soft material folded transversely, as in the Brown patent, to yield a collapsible shade. The front surface of the shade consists of a number of drooping loops formed by doubling the material back on itself. The successive cells are spaced in the expanded position of the shade by a relatively vertical rear wall section of each cell. The Schneider construction is relatively complex and requires a large amount of material per cell. Furthermore, since the Schneider shade is formed of a wide strip of material folded transversely, this limits the width of the shade which can thus be formed to the width of the stock material available.

SUMMARY OF THE INVENTION

It is an object of the invention to provide a improved Roman shade consisting of a number of parallel generally tubular cells, each having a front wall which consists of a loop formed of a soft material which is essentially uncreased in the finished product, such that the loop droops somewhat, providing an aesthetically pleasing appearance, while the rear wall of each cell is essentially linear when the shade is in the expanded state, such that the width of the rear wall determines the spacing of adjacent cells and hold the loop of the front wall from being pulled out.

It is a further object of the invention to provide a Roman shade which does not use excessive material per cell, and which is formed of a relatively narrow strip of material folded longitudinally, such that the width of the shade is not limited by the width of stock materials available.

It is a further object of the invention to provide a shade which can be manufactured using essentially conventional methods and apparatus, as shown, for example, in the Colson and Anderson patents.

These and other objects of the invention which will appear to those skilled in the art are met by the present invention, which comprises an improved Roman shade consisting of a number of parallel cells. Typically, each cell is formed of a single narrow strip of relatively soft flexible material. The strip of material is folded into a cell structure and bonded to one or more adjacent and similar cell structures to make up the assembly of cells. Each cell includes a rear wall portion, which is substantially vertical or linear when the shade is in its expanded state, a bottom portion extending forwardly from the back wall, and a front wall portion defining a generally drooping curved surface extending in a curve from the front top portion of the cell downwardly and away from the rear wall portion. The cell front surface provides an extremely attractive appearance. The shade may be manufactured generally using the techniques and apparatus shown in the Colson and Anderson patents, from a relatively narrow strip of material, such that a shade of any desired width can be manufactured.

DESCRIPTION OF THE PREFERRED EMBODIMENTS

Figure 1:
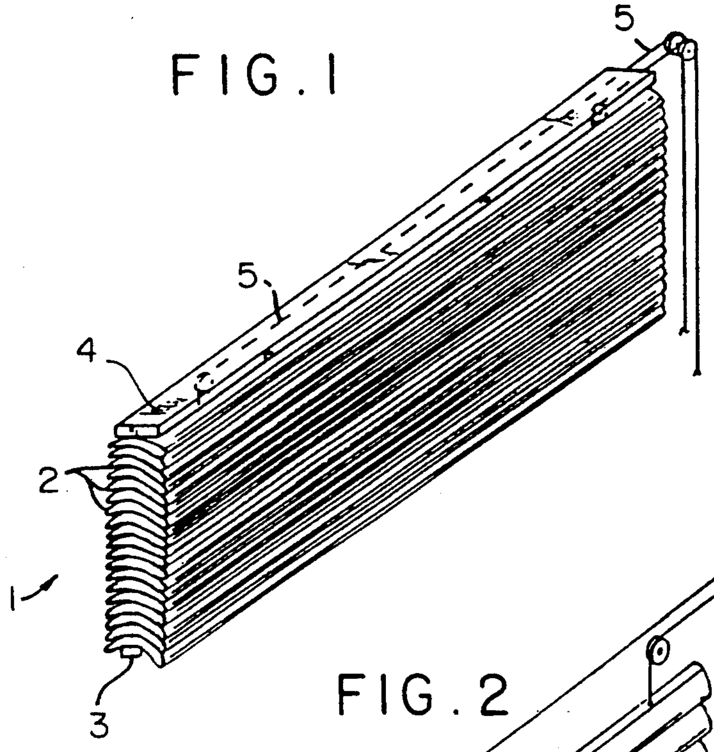
FIG. 1 shows a first embodiment of the shade of the invention in its nearly collapsed state.
Figure 2:
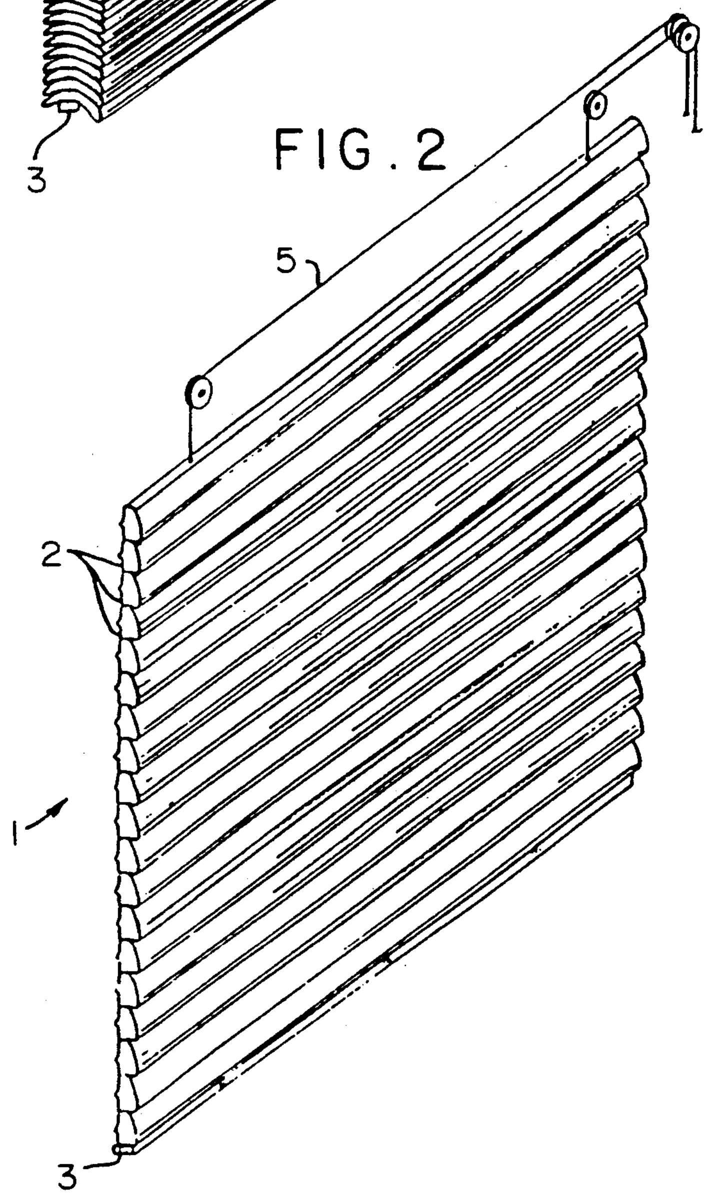
FIG. 2 shows the shade of FIG. 1 in its expanded state.

As indicated above, FIGS. 1 and 2 show the shade of the invention in its collapsed and expanded states. As can be seen, the shade comprises an assembly 1 made up of a plurality of parallel cells 2 extending horizontally. The assembly of cells 2 is fitted with a bottom rail 3 and a head rail 4 (omitted from FIG. 2 for clarity). The assembly is adapted to be fitted into a window opening, for example, with the longitudinal cell axis at an angle of 90 degrees with respect to the direction of expansion and contraction of the assembly. The motion of the shade between the collapsed state of FIG. 1 and the expanded state of FIG. 2 is controlled by two or more control cords 5 extending from the bottom rail 3 upwardly through the cells 2, and into the head rail 4. The cords are directed by generally conventional control pulleys, guides and the like, and are engaged by a conventional locking dog engaging mechanism (not shown).

As indicated in FIGS. 3–6, the cells 2 are formed of individual strips 6 of fabric material joined to one another to make up each cell structure 2. Each cell 2 has a cross-sectional shape including a droopy front wall extending downwardly and outwardly from the top portion of each cell, and so that each cell is wider toward the bottom of each cell. Preferably, the fabric of the cells is sufficiently soft and flexible and the front walls are sufficiently wide compared to the rear wall so that the front bottom portion of each cell droops downwardly at least as far as the juncture between the cell and the directly adjacent lower cell when the shade is in the expanded state. Accordingly, when the shade is in its collapsed state as shown in FIG. 1, the drooping loop formed by each cell extends well below the adjacent lower cell.

Figure 3:
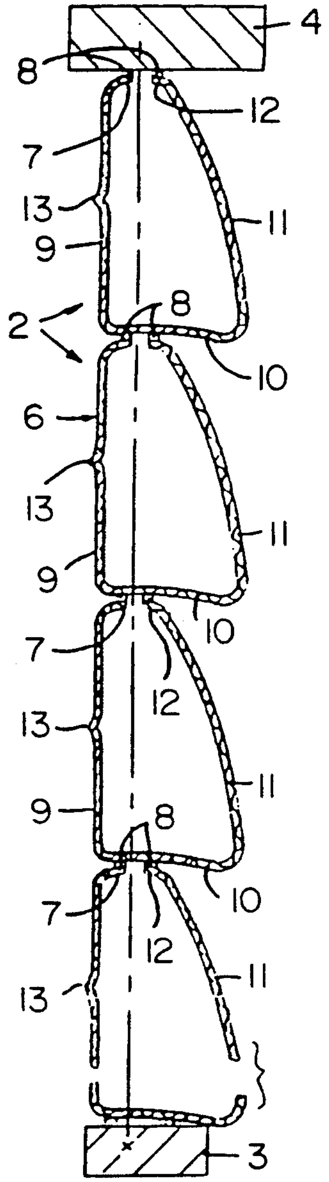
FIG. 3 shows a cross-sectional view through a portion of the shade of FIG. 1 in the expanded state showing the individual cell structure of the shade.
Figure 10:
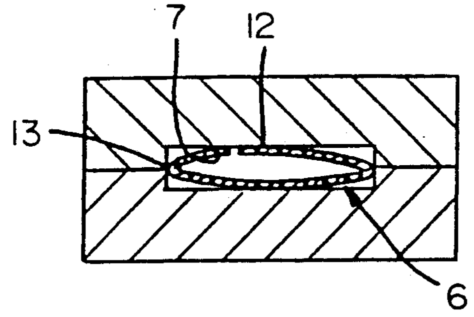
FIG. 10 is a cross-sectional view, taken along lines 10—10 of FIG. 9, of the strip material used to form the cell structure of FIG. 3, after an initial folding step.

As can be seen from FIGS. 3 and 10, each cell 2 making up the window covering 1 is formed of a strip of material 6 folded longitudinally and bonded at its longitudinal edges to a bottom portion of the next upper cell. In this way, each strip of material is formed into a tubular cell with open ends. As typically used, these shades are disposed between opposed surfaces of the casing of a window. The width of the shade is preferably chosen so that the ends of the cells approach the casing closely, such that little air flow takes place through the cells. In this way the air mass in each cell is essentially static, whereby the cells of air form a very effective thermal insulation.

According to this embodiment of the present invention, each strip of material is formed into a cell 2 having a top rear edge portion 7 which is bonded by a bead 8 of adhesive to the directly adjacent upper cell 2 (or to the head rail 4). A rear wall portion 9 extends downwardly from the top rear portion 7, and a bottom portion 10 extends forwardly from the rear wall portion 9 to a front wall portion 11. The front wall portion 11 extends forwardly from the bottom portion and then upwardly to a top front edge portion 12. The top front edge portion is adhesively bonded by a second bead 8 of adhesive to the cell bottom portion 10 of the directly adjacent upper cell 2 (or to the headrail 4). The formed cell in cross-section effectively defines a continuous closed loop of strip material.

The basic method of forming the assembled cell structures of the embodiment of FIG. 3 includes an initial step of folding the strip of material 6 into a tubular form as shown in FIG. 10. The method is fully disclosed, most particularly at column 4, line 4 through column 9, line 55, in the Colson U.S. Pat. No. 4,450,027, which patent is incorporated herein by reference.

According to the invention, it is desirable that the cell be asymmetrical in that the front wall portion 11 be substantially wider (as measured in the vertical direction of the final window covering, i.e., at 90 degrees to the longitudinal axis of the cell) than the rear wall portion 9. Also, it is preferred that the entire strip be formed of a relatively soft and flexible fabric material so that in the expanded position shown in FIG. 3, the front wall portion 11 droops downwardly and outwardly away from the rear wall 9, forming a smoothly rounded curve. Typically, the lowest part of the front wall portion is level or beneath the juncture of the cell with the directly adjacent lower cell. This provides an extremely attractive appearance. Typically, the plane in which the two adhesive bonds 8 lie is inclined downwardly from back to front so that the rear bond is higher than the front bond. See FIG. 6 where this is shown. It is usually preferred that the front wall portion not be creased perceptibly when the shade is in use, principally for aesthetic reasons. However, as discussed below it may be desirable in some embodiments to form a temporary crease in the front wall portion 11 to assist in fabrication of the shade.

As also indicated in FIG. 3, the rear wall portion 9 may include a longitudinal crease 13 extending generally along its center. Such a crease can be formed by pressure and heat applied during the formation of the strip into a cell, as described in detail in Colson U.S. Pat. No. 4,450,027. The crease 13 serves dual functions. A first function is to provide a reference surface by which the strip of material can be guided during the fabrication process. The crease 13 also guides the collapse of the cell, such that the cells collapse uniformly and evenly.

In the expanded state of the shade of the invention shown in FIG. 3, the width of the rear wall 9 effectively defines the spacing of the cells 2. In this way the cells 2 are of uniform width from the top to the bottom of the shade, for uniformity of appearance.

The extent of cell expansion of the assembly is thus controlled by the width of the rear wall portion of each cell; and this, in turn, determines the curvature of the generally curved surface of the front wall portion of the cell.

Figure 4:
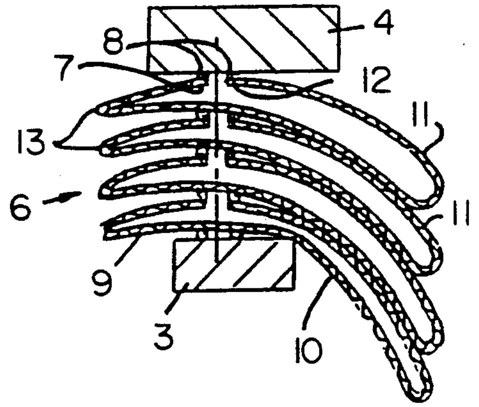
FIG. 4 shows a cross-sectional view of the embodiment of FIG. 1 in the nearly collapsed state.

FIG. 4 shows the shade of FIG. 3 in the nearly collapsed state. If used, the creases 13 at the rear of each cell serve to ensure uniform collapsing of the cells. The drooping front wall portions 11 of each cell extend substantially over the next lower cells.

Figure 5:
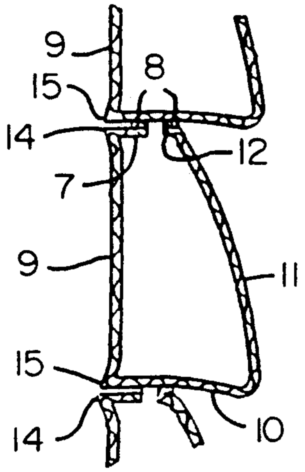
FIGS. 5 and 6 are cross-sectional views of further alternative embodiments of the invention.

In some embodiments, the rear crease 13 may not be desirable. However, it may still be desirable to incorporate a crease at some other point in the structure for guiding the cells during the manufacturing process. As shown in FIG. 5, creases 14 and 15 are provided at both of the junctures of the rear wall portion 9 with the top and bottom portions of the cell. These creases serve as guides during the manufacturing process. In the finished shade, these creases 14 and 15 will not be as evident as the single creases 13. In other respects, the structure of FIG. 5 is the same as that of FIG. 3.

Figure 6:
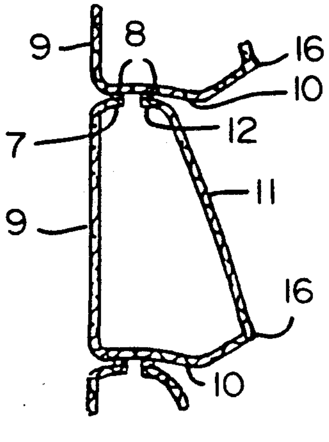

FIG. 6 shows yet another embodiment of the invention in which a crease 16 is provided in the front wall portion 11. Crease 16 may be formed permanently if desired for aesthetic reasons. Alternatively, it may be temporary, as can any of the other creases in the cell, for providing a guide for ensuring uniform assembly during the manufacturing process of the strips into cells.

A temporary crease to assist in manufacture of the shade of the invention can be provided in a number of ways. For example, in order to form a permanent crease in a polyester film material, it is necessary to heat the material to a given temperature while folding it and to pressing it against a hard surface to form a sharply set crease. However, a temporary crease can be formed during the manufacturing process by pressure with a limited amount of heating. If the shade is then hung and allowed to expand, and the crease is heated above a transition temperature, the polyester material will tend to return to its original shape, so that the temporary crease will effectively disappear.

Similarly, a cotton fabric with a water soluble sizing such as starch can be used to form the shade of the invention. Such a sized cotton fabric can be creased as if it were paper. However, the starch can be dissolved if the shade is subsequently hung out and wetted, removing the creases. Similar techniques may be useful with polyester and synthetic materials.

Finally, a temporary adhesive can be applied to each strip inside the fold defining the front wall during the assembly process, causing the two sides of the front wall to be temporarily bonded, and holding the cell flat for the manufacturing process without imparting a permanent crease. When the shade has been completed, it can be hung out and the adhesive removed. If a water-soluble adhesive is used, it can simply be washed away. Similarly, the two sides of the front and rear walls can be temporarily bonded during assembly using a known heat sensitive adhesive which self-adheres at temperatures, for example, up to 200° F. If this is used to hold the strips flat during stacking, the temporary creases thus formed can be removed by heating the assembly and pulling the temporary creases out.

It is possible to form the shade of the invention from materials which do not crease, such as elastomeric materials.

As indicated above, it is an object of the preferred embodiment of the invention to provide a shade having cells each comprising smooth and uncreased curved front wall portions 11, and in which permanent creases are avoided during assembly. In the conventional Colson process each strip of material is typically creased longitudinally to create front and rear edge portions which essentially meet each other. Next, beads of adhesive are applied along the edges of the creased strips of material, and they are stacked, one on top of the other, on a stacking arm. Pressure is applied to ensure that the adhesive bond is properly formed. According to the present invention, it is desired to avoid flattening of the cells which would prevent the front wall portion 11 from remaining smooth and uncreased.

Figure 7:
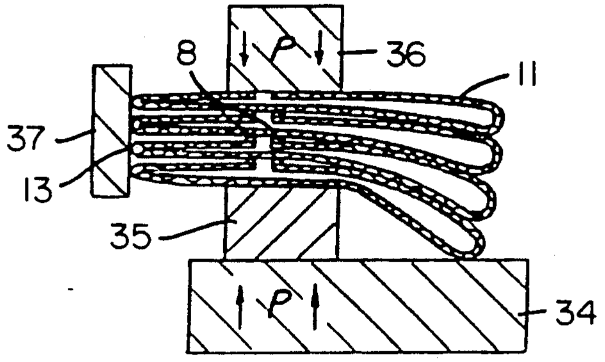
FIG. 7 shows schematically a modification to the manufacturing technique which is used in fabrication of the shade of the invention.
Figure 9:
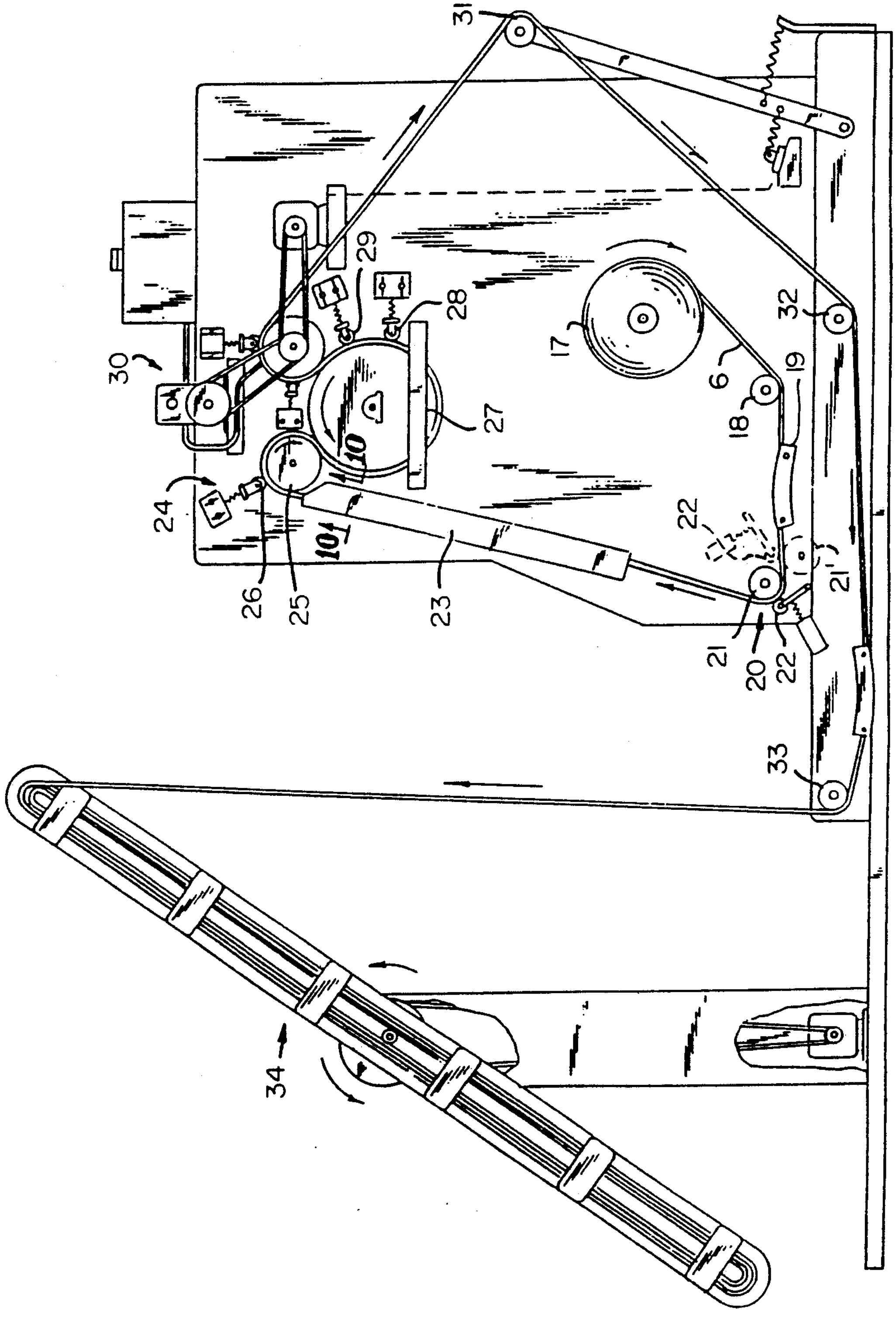
FIG. 9 is a plan view of a suitable apparatus for fabricating the shade structure according to the method of the present invention.

FIGS. 7 and 9 of the present application show the apparatus of the '027 patent as used in accordance with the teachings of the present invention. As shown in FIG. 9, a supply of foldable material 6 is provided by the roll 17. From the supply roll 17, the length of material is directed around the guide roller 18 and through an alignment block 19. The alignment block functions to keep the length of material in proper alignment for the initial creasing of the material. Creasing, to the extent desired as discussed above, is initiated by the creaser assembly 20. This assembly includes a backing roller 21 disposed on one side of the length of material 6. Creaser wheel 22 cooperates with the backing roller 21. This wheel has a sharp peripheral surface. As the length of material 6 passes through the creaser assembly, a crease 13 is formed in the material on one side thereof. After leaving the creaser assembly 20, the length of material 6 is fed through a folding mechanism 23. This mechanism may be constructed in any suitable manner to fold the length of material longitudinally along the crease line 13. The folding is such as to fold the longitudinal edge 7 over one side of the length of material. The longitudinal edge 12 is at the same time folded over the one side of the material with or without a permanent or temporary crease, as desired. This folding of the edges is done progressively as the length of material is fed through the folding mechanism 23. The folded condition of the length of material as it exits from the folding mechanism 23 is shown in FIG. 10. As there seen, the folding is generally in a U pattern and the folded edges generally meet but do not overlap.

After folding of the material, it is directed through a crimper assembly 24 which is comprised of facing crimp rollers 25 and 26. These rollers are aligned with each other and overlie the desired fold lines to tightly press and squeeze the material so as to form a permanent fold along these lines. Depending on the nature of the material, this crimper may or may not be necessary. Where the material has the characteristics of the polyester film material disclosed in the '027 patent, the crimper assembly 24 would be utilized. Also with such material, the fold can be assured of being permanently set by further passing the folded material around the peripheral surface of the roller 27 which is heated. This roller and the cooperating press rollers 28 and 29 apply rolling pressure across the entire width of the material to set the desired crimps permanently at a sharp angle. Again, the roller structure 28 and 29 need not be included where the material does not require its use. Further, other structures may be used, provided that the fold lines are properly set to maintain the angular configuration shown in FIG. 3, 5 and 6. Also in the situations where it is not desirable to have permanent folded lines in both or either of the faces of the final structure, the various crimp and press rollers will be eliminated in the appropriate areas.

An adhesive applicator 30 is provided for progressively applying the adhesive longitudinally of the length of material. The adhesive is applied in two continuous lengths as disclosed in the '027 patent to provide the two beads 8. With the asymmetrical structure, the lateral width of the two lengths of adhesive will, in effect, be offset from the center plane on the structure. This is produced by folding the longitudinal edges of the length of material over onto the center portion of the length by different width distances. With reference to FIG. 10, the longitudinal edge of 7 of the length of material is folded along a fold line 13 and over a width less than the folding of the longitudinal edge 12.

After the adhesive beads 8 are applied progressively to the length of material as it moves through the forming apparatus, the material is directed around suitable guide rollers 31, 32, 33 as more fully described in the '027 patent. From the last guide roller 33, the material is led to a stacking area where it is wound about a stacking arm 34 and into a continuous loop with successive portions of the length overlying preceding portions. This forms a plurality of adjacent stacked layers of folded length of material on the stacking arm. During this stacking operation, the lengths of adhesive beads 8 on the folded material are pressed into engagement with the facing side of the folded material to connect them together and form adjacent connected layers.

FIG. 7 shows schematically, in part, the construction of the stacking arm 34 which allows the front wall portion of the cell to be smooth and uncreased. A spacer member 35 is located on the arm 34 so as to support the strips of material only in the vicinity of the adhesive bonds as they are being formed. A presser member 36 is provided to ensure good bonding. As shown, the lower surface of the stack of strips is spaced away from the stacking arm 34 by the spacer 35, providing room for the looped surfaces of the front wall portions 11, such that they are not creased. A guide 37 is incorporated against which the creases 13 (if used) engage during the assembly process, to ensure that the stack is formed neatly and the shade is properly assembled.

Figure 8:
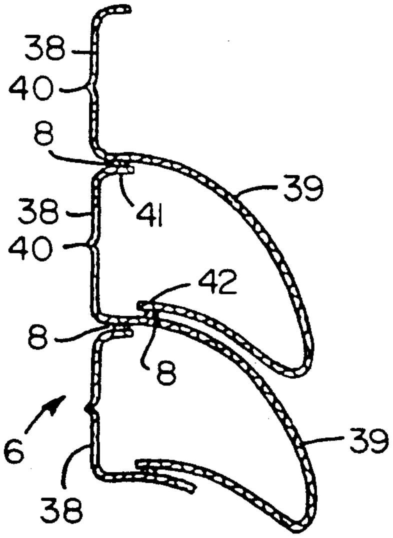
FIG. 8 shows a cross-sectional view of another embodiment of the invention.

The embodiments of the invention shown in detail in FIGS. 3–6 all relate to modification of the basic Colson process, wherein the strip of material is formed into a generally tubular form prior to formation of the final shade structure. FIG. 8 shows a modification of the process shown in the Anderson patent referred to above, wherein instead of forming a tubular configuration, the strip of material is formed into a Z-shape.

More particularly, in the FIG. 8 embodiment, each individual cell includes a rear portion 38 and a front portion 39 similar to the rear and front portions of the embodiment of FIG. 1. Also in the embodiment of FIG. 8, the rear portion 38 is creased at 40 and extends to the top rear edge portion 41 similar to the top rear edge portion 7 of the embodiment of FIG. 1. In the FIG. 8 embodiment, the material forming the front top portion of the cell does not terminate at the top of each cell but instead extends into and forms the back wall portion 38 of the directly adjacent upper cell. Similarly, in the FIG. 8 embodiment, the bottom portion of each individual cell is defined by the material of the front portion as it extends to the adjacent upper cell and by the edge portion 42 of the strip of material.

Figure 11:
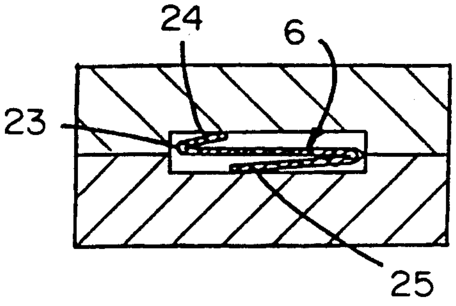
FIG. 11 is a cross-sectional view, similar to FIG. 10, of the strip material used to form the cell structure of FIG. 8, after an initial folding step.

In this embodiment of the invention, the folding and connection of the strip material is such that each individual final cell construction is formed of two separate pieces of material. More particularly, the front wall 39 of each cell, as viewed in cross section in FIG. 8, is formed of one piece of material while the back wall 38 of that cell is formed from a separate piece of material. To join the adjacent cells together in the embodiment of FIG. 8, the two edge portions of each piece of material are joined to the overlapping parts of the other piece of material by beads of adhesive 8. The process of folding and stacking to produce the type of cell structures shown in FIG. 8 begins with an initial step of folding the strip material 6 into the Z-shaped configuration shown in FIG. 11. The method of the Colson U.S. Pat. No. 4,450,027 is employed to produce the cell structures shown in FIG. 8, with an additional backing roller 21' and creasing wheel 22', as shown in dotted lines in FIG. 9, when desired. As noted above, the disclosure of the Colson patent is incorporated by reference herein as to this disclosure.

Finally, in the embodiment of FIG. 8, the front wall portion 39 is formed to be relatively smoothly curved so that it droops downwardly and outwardly away from the rear wall and preferably down over at least a portion of the front of the adjacent lower cell. The rear wall 38 is again essentially straight when the structure is fully expanded, defining the spacing of the cells.

As an alternative to forming the cells by folding up a plain flat sheet of material as above, the cells can be formed of an extrudable plastic material. The flattened tubular cell can then be formed directly by extrusion, rather than by folding a continuous strip of material. Such techniques are shown generally in Rasmussen U.S. Reissue Pat. Nos. 31,129 and 30,254. Such techniques are referred to in the appended claims as formation of the cells from a "shaped" strip of material. In some cases it might also be desirable to use both of these and/or other methods of forming the cells in manufacture of a single shade according to the invention, while maintaining a uniform appearance and satisfactory operational characteristics.

In all of the embodiments shown herein, the width of the strip of material is essentially equal to the cross-sectional circumference of the cell, less any gap between its opposed edges. However, it is possible that in some embodiments the edges of the strip may be overlapped and that the width of the strip may be up to two times the actual final circumference of the cell. These techniques may be useful in embodiments of the invention where each strip of material forms portions of two or more cells, as in the Anderson patents discussed above.

Therefore, while several embodiments of the invention have been discussed above, the invention is not to be limited thereby, but only by the following claims.

We claim:

1. A method of manufacture of an expandable and collapsible window covering from elongated, flat, flexible strip material having longitudinal edge portions into an assembly of substantially parallel cell members with a rear wall portion, a bottom portion, a top portion and a front wall portion having a loop shaped surface, comprising the steps of:

a) folding said strip material along longitudinal lines spaced from the edges of said longitudinal edge portions to provide temporary longitudinal creases with the longitudinal edge portions overlying the flat flexible strip material between the temporary longitudinal creases;

b) stacking successive lengths of said material one on top of another and joining each of the folded longitudinal overlying edge portions of each of said lengths to a next successive length to form the assembly of adjacent overlying cell members; and c) removing the temporary creases after formation of said assembly.

2. The method of claim 1, wherein said material is a sized fabric; and said temporary creases are removed by expanding said assembly and then wetting said assembly with water.

3. The method of claim 1, wherein said material is a thermoplastic material; and said temporary creases are removed by heating said assembly.

4. The method of claim 1, wherein said material is a polyester material;

said temporary creases are formed by applying pressure to said material while heating said polyester material to a first temperature; and said temporary creases are removed by heating said assembly to a second temperature, said second temperature being higher than said first temperature and said second temperature being higher than the transition temperature of said polyester material.

5. The method of claim 1, further comprising the steps of:

temporarily bonding at least one of said overlying longitudinal edge portions to said flat, flexible strip material at a location between the temporary longitudinal creases using a temporary adhesive material; and then removing the temporary adhesive material after formation of said assembly.

6. A method of manufacture of an expandable and collapsible window covering from at least one elongated strip of flat flexible material having longitudinal edge portions into an assembly of substantially parallel tubular cell members with a rear wall portion, a bottom portion, a top portion and a front wall portion having a loop shaped surface, comprising the steps of:

a) folding said strip material along longitudinal lines spaced from the edges of said longitudinal edge portions to provide a folded material with the longitudinal edge portions overlying the flat flexible strip material between the longitudinal folds;

b) stacking successive lengths of said folded material one on top of another and joining each of the folded longitudinal overlying edge portions of each of said lengths of material to a next successive length of material to form the assembly of adjacent overlying cell members;

c) supporting only a portion of said folded material during stacking, said folded material portion being located between said longitudinal folds, and said longitudinal folds being unsupported during stacking.

7. The method of claim 6, wherein said longitudinal folds define temporary longitudinal creases, and said method further comprises removing the temporary creases after formation of said assembly.

8. The method of claim 7, wherein said material is a sized fabric; and said temporary creases are removed by expanding said assembly and then wetting said assembly with water.

9. The method of claim 7, wherein said material is a thermoplastic material; and said temporary crease are removed by heating said assembly.

10. The method of claim 7, wherein said material is a polyester material;

said temporary creases are formed by applying pressure to said material while heating said polyester material to a first temperature; and said temporary creases are removed by heating said assembly to a second temperature, said second temperature being higher than said first temperature and said second temperature being higher than the transition temperature of said polyester material.

11. The method of claim 6, wherein the successive lengths of material are joined such that the front wall portion of each cell member is formed by a first amount of material and the rear wall portion of each cell member is formed by a second amount of material, said first amount of material being greater than said second amount of material and said first amount of material being sufficient to allow the loop shaped surface of the front wall portion to extend in front of at least part of the front wall portion of an adjacent lower cell in the assembly when the window covering is in the expanded condition.

12. The method of claim 11, wherein the longitudinal edge portions of said strip material overlie the same side of the strip material with the opposed longitudinal edge portions approaching but not overlapping one another.

13. The method of claim 11, wherein the longitudinal edge portions overlie opposite sides of the strip material.

14. The method of claim 6, wherein the step of stacking and joining comprises winding the folded strip material around a rotating means for supporting the material.

15. A method of manufacture of an expandable and collapsible window covering including an assembly of substantially parallel collapsible tubular cell members, each of said tubular cell members having a rear wall portion including a rear fold when collapses, a bottom wall portion, a top wall portion, and a front wall portion having a loop shaped surface and including a front fold when collapsed, said method comprising:

providing a flexible elongate material having spaced apart first and second temporary longitudinal creases formed therein, said elongate material including a first longitudinal edge portion extending from said first temporary longitudinal crease to a first longitudinal edge of said elongate material, a second longitudinal edge portion extending from said second temporary longitudinal crease to a second longitudinal edge of said elongate material, and a center portion between said first and second longitudinal creases, each of said first and second longitudinal edge portions overlying said center portion;

applying a first length of an adhesive material to said elongate material parallel to said first longitudinal crease and spaced a first distance from said first longitudinal crease, and applying a second length of the adhesive material to said elongate material parallel to said second longitudinal crease and spaced a second distance from said second longitudinal crease, and first distance being greater than said second distance;

stacking successive lengths of said elongate material one on top of another and joining each of the first and second longitudinal edge portions of each of said lengths of elongate material to the center portion of a next successive length with said first and second lengths of adhesive material; and removing the temporary creases after formation of said assembly.

16. The method of claim 15, wherein:

the step of providing the flexible elongate material comprises supplying a flexible flat strip and folding the strip material along longitudinal lines spaced from the edges of said strip material to provide said first and second longitudinal creases; and the step of stacking and joining comprises winding the elongate material around a rotating means for supporting the elongate material.

17. The method of claim 16, wherein the first and second longitudinal edge portions are folded over the same side of the center portion of the elongate material.

18. The method of claim 16, wherein the first and second longitudinal edge portions are folded over opposite sides of the center portion of the elongate material.

19. The method of claim 15, wherein said elongate material is an extruded cross-sectionally shaped material.

* * * * *